(12) United States Patent
Meierhans et al.

(10) Patent No.: US 9,954,346 B2
(45) Date of Patent: Apr. 24, 2018

(54) FACILITY FOR THE PROCESSING OF A MULTI-CORE CABLE

(71) Applicant: SCHLEUNIGER HOLDING AG, Thun (CH)

(72) Inventors: Ivo Meierhans, Lucerne (CH); Carmelo Messina, Baar (CH)

(73) Assignee: Schleuniger Holding AG, Thun (CH)

( * ) Notice: Subject to any disclaimer, the term of this patent is extended or adjusted under 35 U.S.C. 154(b) by 162 days.

(21) Appl. No.: 14/538,853

(22) Filed: Nov. 12, 2014

(65) Prior Publication Data
US 2015/0128399 A1 May 14, 2015

(30) Foreign Application Priority Data

Nov. 11, 2013 (EP) ..................................... 13192380

(51) Int. Cl.
B23P 23/00 (2006.01)
H02G 1/12 (2006.01)

(52) U.S. Cl.
CPC ...... H02G 1/1248 (2013.01); *Y10T 29/49819* (2015.01); *Y10T 29/53274* (2015.01)

(58) Field of Classification Search
CPC ............. H01B 15/005; Y10T 29/53274; Y10T 29/49819
USPC ........ 29/867, 828, 564.4, 748, 426.2, 426.3, 29/762
See application file for complete search history.

(56) References Cited

U.S. PATENT DOCUMENTS

| | | | | |
|---|---|---|---|---|
| 4,633,570 A * | 1/1987 | Burgit | .................... | H01R 43/01 29/33 M |
| 4,649,621 A * | 3/1987 | Dusel | .................... | H01R 43/28 29/564.4 |
| 4,713,880 A * | 12/1987 | Dusel | .................... | H01R 43/05 29/564.4 |
| 5,751,847 A | 5/1998 | Wuyts | | |
| 6,776,196 B2 * | 8/2004 | Yamakawa | ............ | H01R 43/05 140/71 R |

(Continued)

FOREIGN PATENT DOCUMENTS

| DE | 3440711 A1 | 5/1985 |
|---|---|---|
| DE | 3440711 C2 | 6/1989 |

(Continued)

OTHER PUBLICATIONS

EPO search report and written opinion from priority EPO application EP13192380, dated Jan. 31, 2014 (in German).

*Primary Examiner* — A. Dexter Tugbang
*Assistant Examiner* — Azm Parvez
(74) *Attorney, Agent, or Firm* — Davis & Bujold PLLC; Michael J. Bujold

(57) ABSTRACT

A facility (1) processes multi-core cable (2) having a screening braid and/or foil sheathing, inner conductors (2*a*), and/or internal filler. The facility (1) includes stations (3, 5-10, 12) each for at least one respective processing step of cable stripping; the opening up, trimming, and folding back of any screening braid present; the removal of any foil present; and the removal of any internal filler present. A transport device transports cut-to-length cables to and from these stations (3, 5-10, 12). The transport system (13) connects stations (3, 5-10, 12). At least one control unit (17) may be provided, whereby all stations (3, 5-10, 12) may be automatically operated.

17 Claims, 2 Drawing Sheets

(56) References Cited

U.S. PATENT DOCUMENTS

| | | | |
|---|---|---|---|
| 7,467,463 B2 * | 12/2008 | Matsuoka | H01R 43/28 29/828 |
| 2005/0050713 A1 | 3/2005 | Locher et al. | |
| 2006/0218771 A1 | 10/2006 | Ikeda et al. | |

FOREIGN PATENT DOCUMENTS

| | | | | |
|---|---|---|---|---|
| DE | 3934401 A1 | | 4/1991 | |
| EP | 0631148 A1 | * | 12/1994 | G01R 31/048 |
| GB | 2149502 A | | 6/1985 | |
| JP | 2002-238125 A | | 8/2002 | |
| WO | 95/12806 A1 | | 5/1995 | |

* cited by examiner

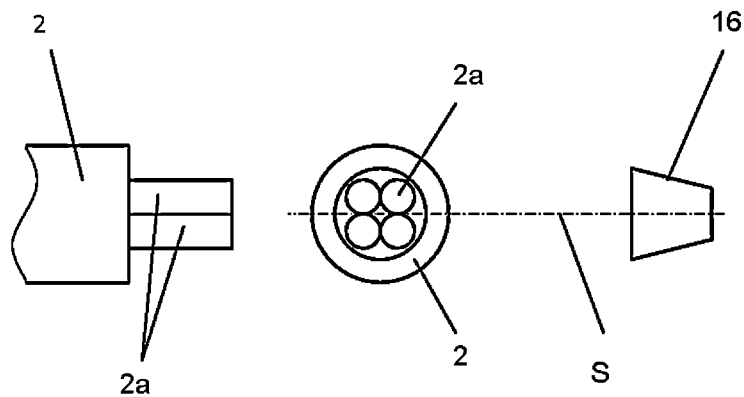
FIG 2B                                    FIG 2A
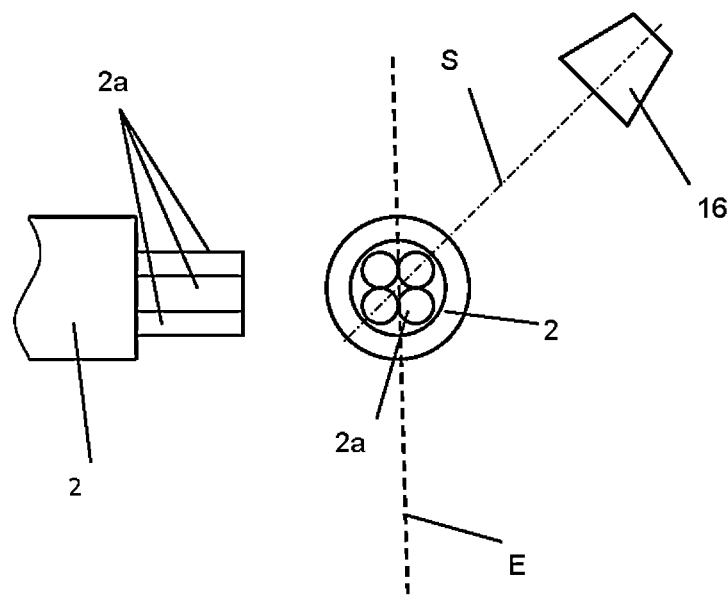
FIG 3B                                    FIG 3A

FACILITY FOR THE PROCESSING OF A MULTI-CORE CABLE

CROSS-REFERENCE TO RELATED APPLICATIONS

This application claims benefit of priority to prior European application no. EP13192380 filed on Nov. 11, 2013 and the entirety of this European application no. EP13192380 is expressly incorporated herein by reference in its entirety and as to all its parts, for all intents and purposes, as if identically set forth in full herein.

BACKGROUND

The present disclosure relates to a facility and a method for the processing of multi-core cables, in particular a facility and a method including a multiplicity of stations and steps, respectively.

Typically such facilities include a multiplicity of stations, each for at least one step of the process: stripping of the cable, opening up, trimming, and folding back of any screening braid present, removal of any foil present, and removal of any internal filler present. A transport device is preferably available for purposes of transporting cut-to-length cables from and to the stations, and to a processing facility, preferably fully automatic, downstream in the process. Also preferably available is at least one control unit for the facility and/or the individual stations.

After at least one step in the process: (a) stripping of the cable, (b) opening up, (c) trimming and folding back of any screening braid present, (d) removal of any foil present, and (e) removal of any internal filler present; the cables processed are transferred to a downstream process. The transport of cables already cut-to-length in advance, to and between the steps in the process, and for transfer to the downstream process, is integrated into the process sequence.

Here, in particular, HSD (High Speed Data) products place very high requirements on the process. Thus at the present time it is not yet possible to process complete HSD cables fully automatically. Currently the processing steps of cable stripping, cutting the screening braid, and folding it back, removing the foil and filler, are executed manually or semi-automatically on individual stations. Only the further processing then takes place on a fully automatic machine. Thus, the processing step of cutting the screening braid is executed, at best, semi-automatically at the present time.

JP2002-238125A describes a device for shifting a part set on a cable by means of an oblique rail. A cable parts shifter, equipped with a guide rail is adopted, which is arranged oblique with respect to a carrier for carrying the cable in the radial direction and shifts the parts into a required position in the longitudinal direction, in contact with the parts set on the cable. A part detector is arranged on the terminal side of the guide rail. The part detector is equipped with a pair of elastic contacts, with the conductive part placed between contacts with the pair of elastic contacts, forms a closed circuit. The guide rail is installed between a braid cutter and a braid folder for the cable terminal processor, and a shield contactor being a part is shifted along the guide rail to the vicinity of the braid of the cable.

DE3934401A1 discloses a machine for sorting by color the individually insulated conductors of a multicolor cable and placing them in predetermined order in a comb type receptacle. This machine has a travelling head that smoothes and separates the cores after removal of the outer insulation from the cable end. The head distributes the cores across the width of lips and the free ends of the cores are gripped and tensioned by the clamps of a tensioning unit. A color sensor controls the insertion of the cores into the receptacle in the desired order via a punch. This eliminates the possibility of human error and fatigue during the making up of complex cable terminations as used in telecommunications and data networks.

A method for stripping an electrical cable is disclosed in US2006/0218771A1. The method comprises the steps of: positioning the seal on the electrical wire in a position removed a specified distance in an axial direction from a front-end surface of the electrical wire; cutting a cover of the electrical wire by pressing cutting blades against the cover of the electrical wire between the seal and the front-end surface of the electrical wire; removing a cut portion of the cover by moving the cutting blades toward the front-end surface; cutting a core wire of the electrical wire by pressing the cutting blades against the core wire of the electrical wire between the seal and the front-end surface of the electrical wire; and moving the seal in the axial direction toward the front-end surface of the electrical wire to position the seal in the vicinity of a front-end surface of a remainder of the cover.

According to the WO9512806A1 the color or color code of an object can be determined by use for example of a color camera for making a color picture of the object. For a plurality of pixels of the color picture of the object distributed over the surface of the object, the S-, H- and B-values of the color picture are determined and the color is determined by comparison of these S-, H- and B-values with predetermined reference values. The B-value of each pixel is compared with a first reference value determining whether a pixel is black or not, whereafter, if the pixel is not black, the S-value of each pixel is then compared with a second reference value determining whether a pixel is colorless or not, whereafter, if the pixel is not colorless, the color of each pixel is determined by means of the H-value.

The continuous cable processing apparatus for producing cable sections with processed ends according to US2005/0050713A1 comprises a cable transport apparatus having at least one transport means for moving and holding the cable in the axial direction and, transversely thereto, a knife station. According to a special variant, two transport means are arranged in the longitudinal cable direction on both sides of the knife station and, after the cable has been cut through, each hold one of the cable end regions produced on cutting, so that said end regions are movable in the longitudinal cable direction. At least one of these end processing stations is arranged transversely with respect to the longitudinal cable direction, adjacent to the knife station and at least one transport means is movable transversely with respect to the longitudinal cable direction so that a cable end region can be fed to the end processing station.

Lastly, the DE3440711C2 discloses a process for automated production of electric plug assemblies. There, the identity and positioning of the exposed insulated conductors of a length of multi-conductor cable prior to automatically connecting the conductors to the plug pin terminals is effected by directing white light from source on to the exposed insulated conductors; dividing light reflected into three separate branches, e.g., by fibre optic probe. The light from each branch is filtered to provide a different primary color, then the intensities of the filtered primary colors are determined by means of detectors. Each exposed insulated conductor is identified by comparison of the reflected colors of the insulated conductors with each other and with reference values, and automatically the exposed insulated conductors are positioned having regard to the identification e.g. by rotating the cable.

SUMMARY

An object of the present disclosure is thus to configure a facility and a method for the fully automatic preprocessing of cables, in particular for HSD products. In this manner, the linking of a fully automatic machine for processing cables initially prepared at least at one end with the fully automatic facility for cable preprocessing is also to be enabled, and thus a continuous fully automatic processing of cables is enabled from cutting-to-length through to the finished product. Advantageous developments are within the scope of the present disclosure including the figures.

The transport system connects stations in the order of stripping, opening up of any screening braid present, trimming and folding back of any screening braid present, removal of any foil present and removal of any internal filler present. In this manner, the necessary processing order is ensured without need for any user intervention, and as a result of the fully automatic operability of the individual stations, the whole fully automatic processing sequence of the cable preprocessing is ensured. The facility may therefore advantageously be inserted into the production sequence before any fully automatic cable processing facility, and then allows fully automatic rapid production from the cutting-to-length of the pieces of cable through to the finished product fitted with all plugs and connectors.

In any event, it may be particularly advantageous for a further station to be provided, before the transfer to the downstream processing facility, for purposes of fully automatic alignment of the cable in the correct position. The last-cited station is typically arranged upstream of a station for removing any internal filler present. This preferably relates to the order in the process sequence, and not necessarily the spatial arrangement of the stations. In this manner, the optimal alignment of the cable when transferred to the cable processing facility is ensured.

At least one of the processing stations may preferably be operated fully automatically. This may preferably be true for all processing stations.

The station for purposes of alignment of the cable in the correct position advantageously includes a sensor arrangement and also a clamping device for purposes of fixing cable in the correct position for onward transport and transfer to the downstream processing facility. In this manner, the alignment of the cable in the correct position is monitored by the sensor arrangement, and the cable, after its alignment, is fixed in the correct position and thus transported onward or transferred to a downstream process.

Provision is thereby preferably made for the sensor arrangement to comprise a color recognition device laterally spaced apart from the stripped end of the cable to be processed. This sensor preferably includes a color camera, the observation beam of which is offset at an angle of between 20° and 75°, preferably of 45°, relative to a prescribed plane in which at least two conductors are located side-by-side in the processing operation. In this manner, the cable may be brought into the correct position with a few turns for transfer to the cable processing facility. The colors of the exposed conductor ends are thus registered from the direction that is offset at an angle of between 20° and 75° relative to a prescribed plane, in which at least two conductors are located side-by-side in the processing operation. The angular offset is preferably 45°.

In accordance with an advantageous variant, provision is made that in the control unit of the station for the alignment of the cable in the correct position, if need be in the form of a module of a supervisory facility controller, a further sequence is implemented in which in the processing mode the color pattern of the exposed conductor ends located side-by-side, determined by the color recognition device, is compared with a prescribed pattern, and the cable is turned until the arrangement of the conductor ends matches the prescribed pattern.

Further advantages, features and details according to the present disclosure ensue from the following description, in which exemplary versions are described with reference to the figures.

The appended list of reference labels is a component of the present disclosure. The figures are described in a connected and comprehensive manner. The same reference symbols denote the same parts, and reference symbols with different indices specify parts with the same or similar functions.

BRIEF DESCRIPTION OF THE DRAWINGS

FIG. 2*a*—is a schematic representation of a camera and the cable recorded by the latter, as is usual in cable processing in another context;

FIG. 2*b*—depicts the image of the cable end recorded by the camera in FIG. 2*a*;

FIG. 3*a*—is a schematic representation of a camera and a cable recorded by this camera; and, FIG. 3*b*—depicts the image of the cable end recorded by the camera in FIG. 3*a*.

DETAILED DESCRIPTION

Figure 1:
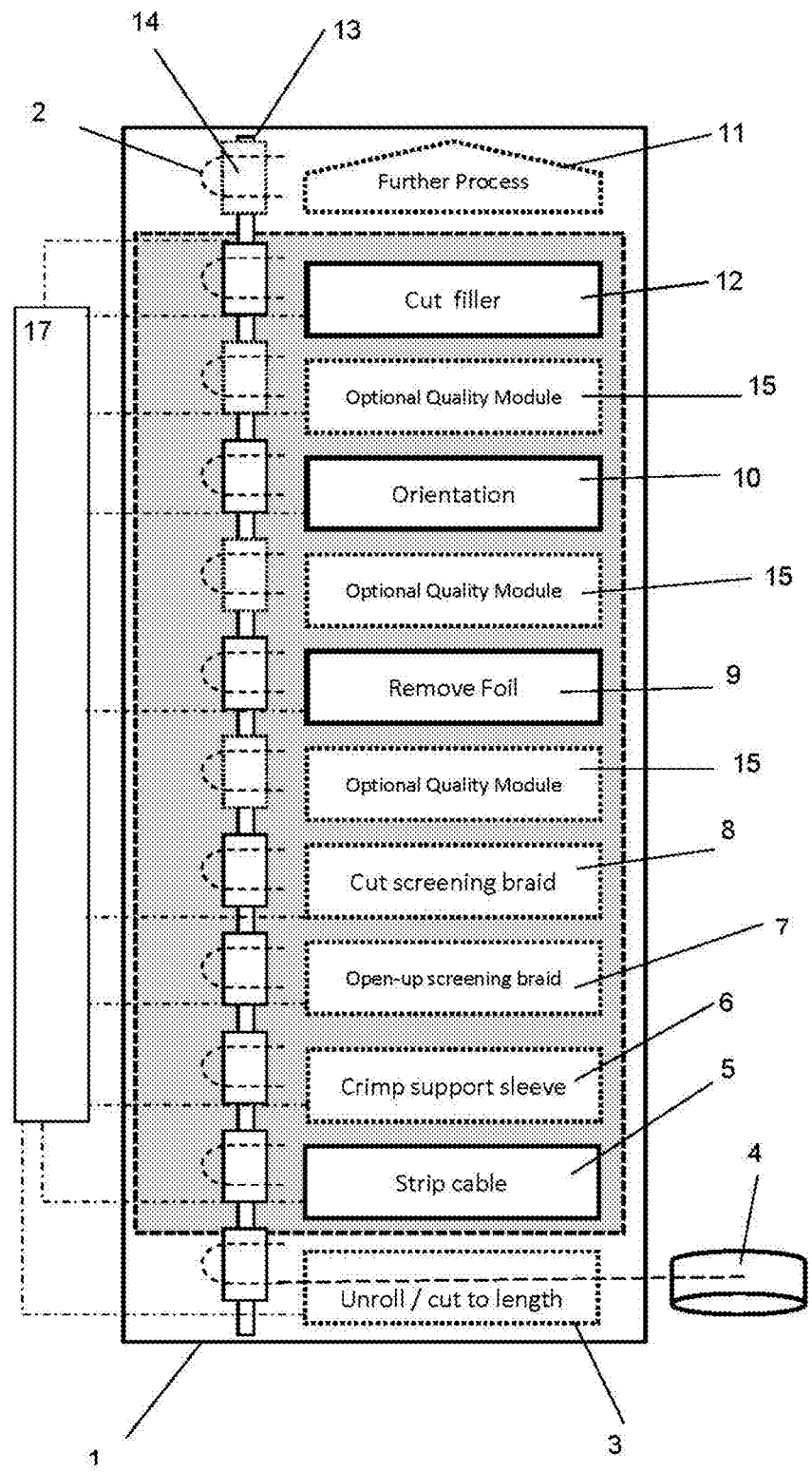
FIG. 1—is a schematic of a facility in accordance with an advantageous version, incorporating all essential processing stations.

Reference in this specification to "one embodiment," "an embodiment," "one version," "a version," "a variant," and "one variant," should be understood to mean that a particular feature, structure, or characteristic described in connection with the version, variant, or embodiment is included in at least one such version, variant, or embodiment of the disclosure. The appearances of phrases "in one embodiment", "in one version," "in one variant," and the like in various places in the specification are not necessarily all referring to the same variant, version, or embodiment, nor are separate or alternative versions, variants or embodiments mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, if the specification states a component or feature "may", "can", "could", or "might" be included or have a characteristic, it should be understood that that particular component or feature is not always necessarily required to be included or have the characteristic. Additionally, as used throughout this specification, the terms 'a', 'an', 'at least' do not denote a limitation of quantity, but rather denote the presence of at least one of the referenced item, and the term 'a plurality' denotes the presence of more than one referenced items.

The facility 1 depicted in the schematic representation in FIG. 1 is configured, for example, for the preparation of at least one end of a cut-to-length cable 2 (see also FIGS. 2*a* to 3b) for purposes of affixing a plug or other connecting element in a cable processing facility downstream of the facility 1 in the process. The group of possible stations includes one or more stations, in each case for one step in the process of preparing the cable 2. The group of stations, all of which are present in a preferred version of the facility 1, includes, for example, one station 3 for the unrolling and cutting-to-length of the cable 2 coming from the coil 4 or from another storage container. A further station 5 may be provided for stripping 5 at least one of the ends of the cable 2. A station 6 for the affixing and crimping of a support sleeve is also preferably present. Any screening braid present on the cable 2 is opened up in a further station 7 and preferably trimmed in a following station 8. The stations 7 and 8 for purposes of opening up and trimming the screening braid may also preferably be combined into one station. In the latter station 8, or alternatively in an additional station (not explicitly represented in FIG. 1), the screening braid of the cable 2 is also folded back. Needless to say, stations 15 for quality control of the processes in the facility 1 may also be present, wherein the first of these stations 15 for quality control is preferably arranged downstream of station 8 for the trimming and any folding back of the screening braid. Stations 15 for quality control, i.e. for monitoring and feedback to the processing of the cable 2, may be provided between individual stations, or all stations. A further station 9 may be provided for the removal of any foil present around the internal conductors 2a (see FIGS. 2b and 3b) of the cable 2. It is preferably again followed by a station 15 for quality control and checking of the preceding process.

Here it should be noted that the expressions "upstream" or "downstream" of the station are not spatial specifications, but are primarily concerned with the order in the processing process. While a similar type of spatial arrangement may indeed be advantageous, it is not absolutely necessary.

Particularly advantageous is the supplementation of the above-cited stations by a further station 10 for purposes of orienting, or circumferentially aligning, the cable 2, that is, for the fully automatic alignment of the cable 2 in the correct position, in order to ensure its optimal alignment before transfer to, for example, a downstream cable processing facility for a further process 11 that is represented symbolically. The station 10 for purposes of alignment of the cable 2 in the correct position may be provided as the last station of the preparation process in facility 1, immediately before the transfer to the downstream cable processing facility.

However, this orientation station 10 may advantageously be followed by at least one further processing station 12, in which—or for which—an alignment of the cable 2 in the correct position, also denoted as circumferential alignment, is likewise necessary or advantageous. In particular this station 12 may be provided for purposes of removing any filler present in the cable 2, in which process the conductor ends 2a surrounding the filler are to be bent apart with grippers. Here, it should be understood that for correct gripping of the conductor ends 2a without incurring any damage, the exact alignment of the cable 2 in the correct position is of particular advantage.

Via an automatic transport device 13, the cut-to-length cables are transported from and to the stations, and also preferably directly to the further processing facility 11 downstream in the process. For this purpose they are preferably clamped in the form of loops on transport pallets 14, with the cable end to be processed facing towards the respective processing stations. The transport pallets 14 may be guided in an endless loop, preferably along a track that is, in particular, straight, and on which the above-cited stations are then arranged in the above-cited order.

The transport device 13, and also the individual stations 3, 5 to 10, and 12, and their reciprocal interaction in the form of sequence control, are preferably operated by at least one control unit 17 for the facility 1, wherein the control units for the individual stations 3, 5 to 10, and 12 and for the transport device 13 in the stations are independently implemented, and can only be coordinated with one another by a supervisory control authority. Alternatively, however, the controllers of the individual stations 3, 5 to 10, and 12 and also of the transport device 13 may also be implemented as a module of a supervisory facility controller.

In the station 12 for removing a central filler between the conductors 2a of the cable 2, a processing device is arranged. This processing device has at least one movable gripper for each conductor and/or each pair of conductors 2a of the cable 2. In addition a separate removal device is provided for the central filler, in order to manage the fully automatic removal of the end of the central filler projecting out between the conductor ends that are bent apart. Each gripper in its state holding the conductor or conductor pair 2a can preferably be pivoted out of the way about a respective axis oriented essentially transverse to the cable axis, preferably through an angle of approximately 90°. Here, such axis is preferably located essentially horizontally at the height of the front end of the remaining element sheathing the conductors. In the control unit a sequence can then also be implemented, in which, after gripping the conductors 2a by the grippers, and before the pivoting of the grippers, a relative axial movement can be executed between cable and grippers, preferably leading away from the cable. The removal device itself can preferably be traversed axially in the direction of the pivotable, or pivoted, grippers, and preferably has two knives in a pincer-shaped arrangement, wherein the two knives each lie in a plane and the two planes subtend an angle with one another—if necessary one that can alter as they converge—of at least approximately 90° or less. A suction device can also be provided for the removed parts of the filler.

In the control unit of the station 12 a sequence may preferably be implemented after the removal of the filler in order to pivot the grippers back into the initial position when gripping the conductors 2a, and then to release all grippers from the conductors 2a, as a result of which the conductor ends 2a are automatically brought back into what is now the correct position for further processing. In contrast, in a further optional form of embodiment, provision is made for a sequence to be implemented, by which after removal of the filler only some of the grippers may be pivoted back into the initial position when gripping the conductors 2a, and all grippers can then be released from the conductors. Here, for some of the conductors the defined position is simply specified in terms of a location essentially parallel with the cable axis, and for other conductors the defined position is specified by the bent apart location, in which the conductor ends preferably project out essentially at right angles to the axis of the cable 2. However, all conductors 2a are again aligned in the correct position for further processing.

In order to be able to execute the alignment in the correct position reliably and fully automatically, the station 10 includes a sensor arrangement and a clamping device for purposes of fixing the cable 2 in the correct position for onward transport. Needless to say, a device for purposes of turning the cable 2 about its axis must also be provided and connected with the controller, in order to be able to turn the cable 2 into the correct position in accordance with processing of the sensor signals in the control unit of station 10.

As is schematically represented in FIGS. 2a to 3b, the sensor arrangement is advantageously a color recognition device, preferably a color camera 16, spaced apart transversely, i.e. laterally, from the stripped end of the cable 2 that is to be processed. Its observation beam (line-of-sight) S is preferably offset relative to a plane, typically prescribed by the circumstances of the facility 1, for example the plane E of the transport pallets 14, the planes in which the processing devices of the other stations can be moved, etc. In the said plane E at least two conductors 2a are typically located, in repose side-by-side in the processing operation, and the color recognition device 16—as shown in FIG. 3a—is offset relative to this plane E by an angle of between 20° and 75°, preferably by 45°.

In the control unit of station 10 for purposes of alignment of the cable 2 in the correct position, that similarly to all other station controllers may be implemented in the form of a module of a supervisory facility controller, a further sequence may advantageously be implemented, preferably in the form of appropriate software, in which in the processing mode the color pattern of the exposed conductor ends 2a located side-by-side determined by the camera 16 is compared with a prescribed pattern and the cable 2 is turned until the arrangement of the conductor ends 2a matches the prescribed pattern.

Particularly advantageous is the use of the orientation station 10 and its specific incorporation in the process sequence as described above in a facility 1 for purposes of processing a multi-core cable 2, in particular for HSD products. This station 10 is preferably designed as a station that is operated fully automatically, and is preferably incorporated into a whole group of similarly fully automatic processing stations. Furthermore, for fully automatic operation of the whole facility 1, the transport device 13 is also similarly designed to be fully automatic.

In closing, it should be noted that the above description is intended to illustrate rather than limit the invention, and that those skilled in the art shall be capable of designing many alternative embodiments without departing from the scope of protection of invention as defined by the appended claims. As equivalent elements can be substituted for elements employed in claimed invention so as to obtain substantially the same results in substantially the same way, the scope of the present invention is defined by the appended claims, including known equivalents and unforeseeable equivalents at the time of filing of this application. Furthermore, in the claims, the verb 'comprise' and its conjugations do not exclude the presence of elements or steps other than those listed in any claim or the specification as a whole. The singular reference of an element does not exclude the plural reference of such elements and vice-versa. The mere fact that certain measures are recited in mutually different dependent claims does not necessarily indicate that a combination of these measures cannot be used to advantage.

LIST OF REFERENCE LABELS

1 Facility
2 Cable
2a Conductor ends
3 Station for purposes of cutting cables to length
4 Cable coil
5 Station for purposes of cable stripping
6 Station for purposes of fitting a support sleeve
7 Station for purposes of opening up the screening braid
8 Station for purposes of cutting the screening braid
9 Station for purposes of removing foil
10 Station for purposes of circumferential alignment
11 Downstream process
12 Station for purposes of cutting away the filler
13 Transport device
14 Transport pallet
15 Station for quality control
16 Color camera
17 Control unit
E Plane of the transport pallets
S Observation beam/line-of-sight of the camera

What is claimed is:

1. A cable processing facility comprising:
a cable stripping station configured to strip therein at least one end of at least one cable segment;
a screening-braid opening station situated to receive cable segments after said cable stripping station;
a screening-braid trimming station situated to receive cable segments processed by said screening-braid opening station;
a screening-braid folding station in operative communication with said screening-braid trimming station;
a foil removal station situated to receive cable segments processed by said screening-braid folding station;
a circumferential cable alignment station situated to receive cable segments processed by said foil removal station and configured to detect a circumferential position of a cable end portion and to rotate the cable end portion around its longitudinal axis to a desired circumferential position, if different therefrom, to thereby circumferentially align the cable end portion;
a filler removal station situated to receive cable segments circumferentially aligned by said circumferential cable alignment station;
an automated transporter configured to controllably transport cable segments, and said automated transporter being controlled by a control unit to controllably transport cable segments to and from said circumferential cable alignment station;
a sensor arrangement at said circumferential cable alignment station; and
said sensor arrangement including a color recognition device, and said color recognition device having an observation offset at an angle of between 20° and 75° relative to a two-conductor plane of repose for processed cable.

2. The cable processing facility as claimed in claim 1, wherein said automated transporter is controlled by said control unit to controllably transport cable segments from all of said stations.

3. The cable processing facility as claimed in claim 2, further comprising a track included in said automated transporter, said track operatively communicating all of said stations.

4. The cable processing facility as claimed in claim 1, further comprising:
a track included in said automated transporter; and
at least one transport pallet mounted to travel on said track to transport cable segments.

5. The cable processing facility as claimed in claim 1, wherein said color recognition device is offset at an angle of 45° relative to the two-conductor plane of repose for processed cable.

6. The cable processing facility as claimed in claim 1, further comprising a color camera included in said sensor arrangement.

7. The cable processing facility as claimed in claim 1, wherein said screening-braid opening station and said screening-braid trimming station are combined as one unitary station.

8. The cable processing facility as claimed in claim 1, wherein said screening-braid trimming station and said screening-braid folding station are combined as one unitary station.

9. The cable processing facility as claimed in claim 1, further comprising a crimping station configured to crimp a support sleeve, said crimping station being situated between said cable stripping station and said screening-braid opening station.

10. The cable processing facility as claimed in claim 1, further comprising a quality control station situated before said foil removal station.

11. The cable processing facility as claimed in claim 1, further comprising a quality control station situated after said foil removal station.

12. The cable processing facility as claimed in claim 1, further comprising a quality control station situated after said circumferential cable alignment station.

13. A cable processing facility comprising:
- a cable stripping station configured to strip therein at least one end of at least one cable segment;
- a screening-braid opening station situated to receive cable segments after said cable stripping station;
- a screening-braid trimming station situated to receive cable segments processed by said screening-braid opening station;
- a foil removal station situated to receive cable segments processed by said screening-braid trimming station;
- a circumferential cable alignment station situated to receive cable segments processed by said foil removal station and configured to detect a circumferential position of a cable end portion and to rotate the cable end portion around its longitudinal axis to a desired circumferential position, if different therefrom, to thereby circumferentially align the cable end portion;
- an automated transporter configured to controllably transport cable segments, said automated transporter being controlled by a control unit to controllably transport cable segments to and from said circumferential cable alignment station;
- a sensor arrangement at said circumferential cable alignment station; and
- said sensor arrangement including a color recognition device, and said color recognition device has an observation direction offset at an angle of 45° relative to a two-conductor plane of repose for a processed cable.

14. The cable processing facility as claimed in claim 13, wherein said screening-braid opening station and said screening-braid trimming station are combined as one unitary station.

15. The cable processing facility as claimed in claim 13, further comprising a screening-braid folding station being combined as one unitary station with said screening-braid trimming station.

16. The cable processing facility as claimed in claim 13, further comprising a filler removal station situated to receive cable segments circumferentially aligned by said circumferential cable alignment station.

17. The cable processing facility as claimed in claim 13, wherein said color recognition device at said circumferential cable alignment station is a color camera.

* * * * *